Nov. 19, 1957 J. W. HOLLAND Re. 24,395

MACHINE FOR LAMINATING AND REINFORCING WEBS

Original Filed May 25, 1949 3 Sheets-Sheet 1

INVENTOR

JACK W. HOLLAND

BY Ross Clausen

ATTORNEY

MACHINE FOR LAMINATING AND REINFORCING WEBS

Original Filed May 25, 1949 3 Sheets-Sheet 2

INVENTOR
JACK W. HOLLAND
BY Ross Ashurey
ATTORNEY

MACHINE FOR LAMINATING AND REINFORCING WEBS

Original Filed May 25, 1949 3 Sheets-Sheet 3

INVENTOR
JACK W. HOLLAND

BY Ross Ashurey
ATTORNEY

United States Patent Office

Re. 24,395

Reissued Nov. 19, 1957

24,395

MACHINE FOR LAMINATING AND REINFORCING WEBS

Jack W. Holland, Hopatcong, N. J., by Ludlow Papers, Inc., Needham Heights, Mass., a corporation of Massachusetts, assignee, by mesne assignments Original No. 2,542,139, dated February 20, 1951, Serial No. 95,240, May 25, 1949. Application for reissue June 12, 1957, Serial No. 666,496

2 Claims. (Cl. 154—1.7)

Matter enclosed in heavy brackets [ ] appears in the original patent but forms no part of this reissue specification; matter printed in italics indicates the additions made by reissue.

It is an object of this invention to provide a method and machine which will dispose transverse reinforcing elements accurately between two or more webs of sheet material while the webs are constantly fed forward, and to do this at a substantial rate of feed of the webs.

It is a further object of this invention to provide a method and machine as aforesaid capable of producing simultaneously two 2-ply laminated webs with transverse reinforcing elements between the plies.

The above and other objects will be made clear from the following detailed description taken in connection with the annexed drawings, in which.

In a copending application of Fred Stocker, Serial No. 68,643, filed December 31, 1948, there is described a method and machine for laminating two plies of paper with reinforcing filaments lying between the plies, imbedded in the laminating agent, and extending transverse the length of the webs. The machine and method of the present invention are intended to operate on similar webs but at a greatly increased lineal speed of the webs. The webs may be of any desired material such as cloth or paper and if paper is used any combinations of plain or creped or embossed paper may be used.

Considered as a method the present invention contemplates continuously advancing and superimposing a pair of webs, then wrapping continuously a plurality of filaments transversely around the superimposed webs and thereafter superimposing upon each outer face of the two superimposed webs an additional web so as to have a set of filaments between each exterior and the next adjacent interior web while supplying a laminating agent (in which each set of filaments is embedded) between the uppermost and lowermost pairs of plies. The loops of filament formed at the margins of the first two webs are then severed, permitting the subsequent separation and separate rewinding of two 2-ply laminated webs with reinforcing filaments extending transversely thereof.

Figure 1:
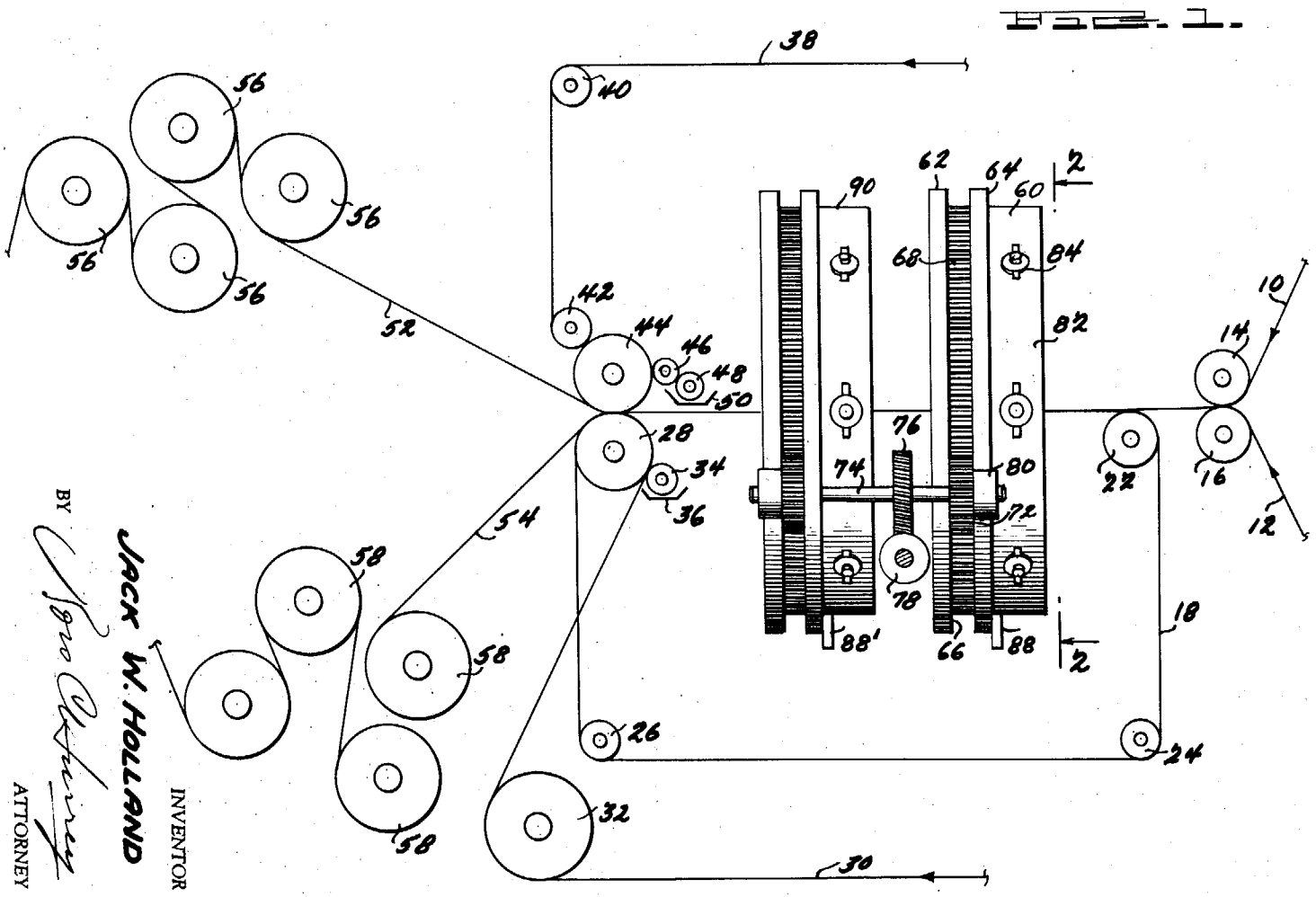
Figure 1 is a diagrammatic elevation view of the improved machine.

Referring now to Figure 1, there is shown a pair of webs 10 and 12 brought together between primary combining rolls 14 and 16. The webs 10 and 12 are fed from conventional rolls (not shown). The webs 10 and 12 pass between a pair of belts 18 and 20. These preferably are flat resilient metallic strips. The belts 18 and 20 are continuous and pass over guide rolls 22, 24 and 26 and also over a secondary combining roll 28.

An exterior web 30 is fed from any conventional source over a guide roll 32, thence to the combining roll 28. A coating roll 34 picks up laminating agent from a vat 36 and applies it to the web 30 as the web

30 passes over the combining roll 28. A second exterior web 38 is fed from any conventional source over a guide roll 40 and a second guide roll 42 which brings it to an upper secondary combining roll 44. An offset roll 46 bears against the web 38 on the upper combining roll 44 and applies to the web laminating agent received from a roll 48 which operates in a vat 50. It will thus be seen that web 10 will be laminated to the web 38 and the web 12 will be laminated to the web [40] *30*. The combined webs 10 and 38 are designated as 52 and the combined webs 12 and 30 are designated as 54. The web 52 leaves rolls 28 and 44 and passes over a series of heated drums 56 while the combined web 54 leaves rolls 28 and 44 and passes over a series of dryer rolls 58. The purpose of these dryer rolls is to cure the laminating agent in the manner set forth in the Stocker application above noted. When the curing operation is complete the webs 52 and 54 are rewound on any conventional reel.

The webs 10 and 12 and the belts 18 and 20 pass between a pair of large, identical wheels or turrets 60 and 90 only one of which will be described in detail. Each wheel has a pair of flanges 62 and 64 which define between them a groove 66. The bottom of the groove 66 is made in the form of gear teeth 68. A pinion 70 is suitably supported at one side and below the center of the wheel and a similar pinion 72 is located at the opposite side. These pinions enter the groove 66 and mesh with the teeth 68. The pinion 72 is rotatively mounted on a shaft 74 to which is secured a helical gear 76 driven by a similar helical gear 78. Any suitable clutch 80 is secured to the pinion 72 and may be used at will to connect the pinion 72 to the shaft 74 for rotation therewith. The wheel 90 is similarly supported on pinions, one of which is similarly mounted for clutching engagement with the shaft 74. This provides means for driving either wheel 60 or wheel 90 or for releasing either wheel and, when released, either wheel may be turned by hand which is an important factor when it is necessary to recharge a wheel with filament.

The speed of rotation of the wheels depends on the number of spindles per wheel, the desired spacing of the filaments on the webs 10 and 12, and the desired lineal speed of these webs. For example, if a wheel has six spindles and it is desired that the spacing of the filaments be one-quarter inch and that the web speed be fifty feet per minute the necessary rotary speed of the wheel is 400 R. P. M.

In practice twenty-four spindles will be used, with a web speed of one hundred feet per minute. At one-quarter inch spacing of the filaments this requires a wheel speed of only 200 R. P. M. Each filament will slope six inches from side to side of webs 10 and 12, forming an angle of about 7° on webs forty-eight inches wide or an angle of a little less than 5° on webs seventy-two inches wide. The angle of slope and the spacing of the filaments, for a given number of spindles and a given web speed, form a joint function of the R. P. M. of the wheel. If, at one hundred feet per minute and twenty-four spindles, the wheel be run at 100 R. P. M. the spacing will be one-half inch and the slope will be 1:4 or about 14° on a forty-eight inch web or 1:6 or a little over 9° on a seventy-two inch web.

Ideally, the filaments should have no slope whatever relative to the length of the web and this ideal result is obtained in the aforesaid Stocker application. The present invention sacrifices the ideal no-slope condition to a great increase in production per machine and the slopes above noted do not have any seriously detrimental effect, particularly when the final web is slit into widths of from one to three inches.

The prior art affords several examples of attempts to use a wheel or an analogous mechanism to supply transverse reinforcing filaments to laminated webs. In all cases, however, the entire set of filaments both upper and lower are supplied between a single pair of webs or are made to surround a single web which then becomes part of a 3-ply laminated product. While a 3-ply product could be made on the present machine there is very little demand for such webs and by the expedient of producing two 2-ply webs on a single machine the cost of the operation is greatly reduced.

From the above it is clear that operating speeds of the wheel may range from 300 R. P. M. to 500 R. P. M. Since the mass of the wheel necessarily is substantial it follows that there can be no abrupt clutching of the wheel to the drive and there must be provided some form of brake to bring a wheel to a stop within a reasonable time after it is unclutched. The problem of braking is solved by the provision of brake shoes 88 manually operated by any suitable linkage, while the problem of clutching is solved by slowing the shaft 78 through a Reeves drive or other conventional speed control mechanism (not shown). This provision of means for adjusting speed of the wheel relative to that of the web is desirable in any event since it permits, within limits, an adjustment of the slope of the applied filaments relative to the direction of travel of the webs.

Figure 2:
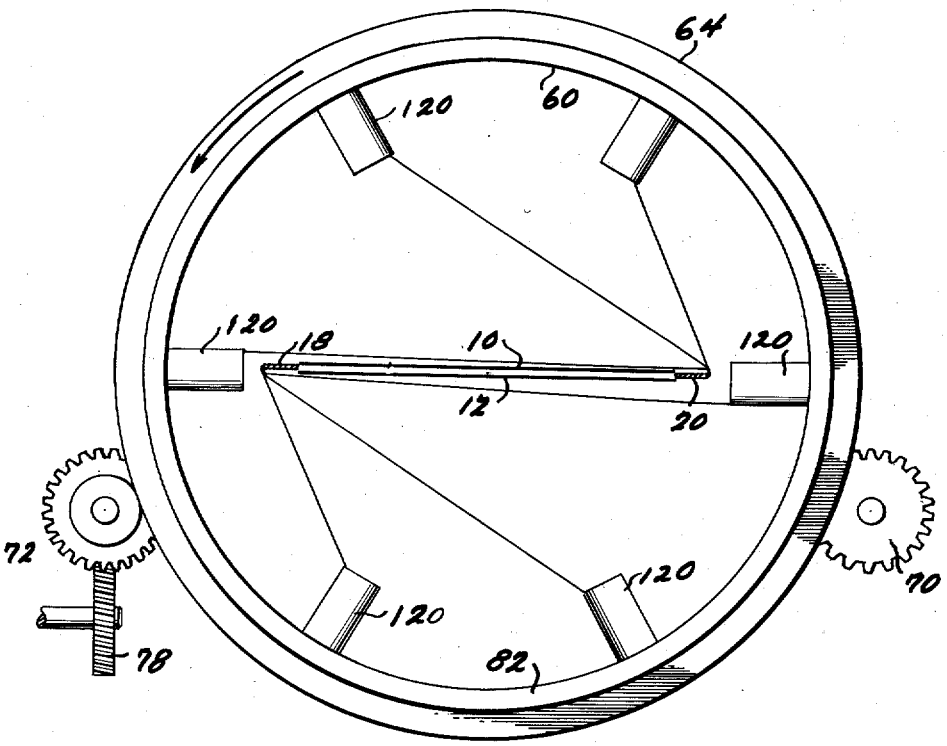
Figure 2 is an elevation on the line 2—2 of Figure 1.

In addition to the flanges 62 and 64 each wheel has a projecting cylindrical portion 82 through which are formed a number of circular openings 84. For simplicity of description only six of these are indicated in Figures 1 and 2. In operation it is contemplated that wheel 60 will be started with six or more complete charges of filament and will be operated until all of the filaments are exhausted. Clutch 80 will then be used to release pinion 72 and wheel 60 from the turning effort of shaft 74 and wheel 60 will be brought to a stop by means of brake shoe 88.

While wheel 60 is operating, wheel 90 will have been charged with filaments. Immediately on unclutching wheel 60 the machine will be slowed and wheel 90, by means of its clutch, will be connected to shaft 74 and the machine will then be restored to full speed. At no time is the drive feeding the webs 10, 12, 30 and 38 interrupted. Flying splices will be made at the rolls as needed. This entails some waste in that there will be occasional defective sections in the final combined webs 52 and 54 but at speeds in the region of one hundred feet per minute this waste does not equal in value the production which would be lost by a shutdown of sufficient duration either to form splices in the web or to recharge a wheel such as 60.

Figure 3:
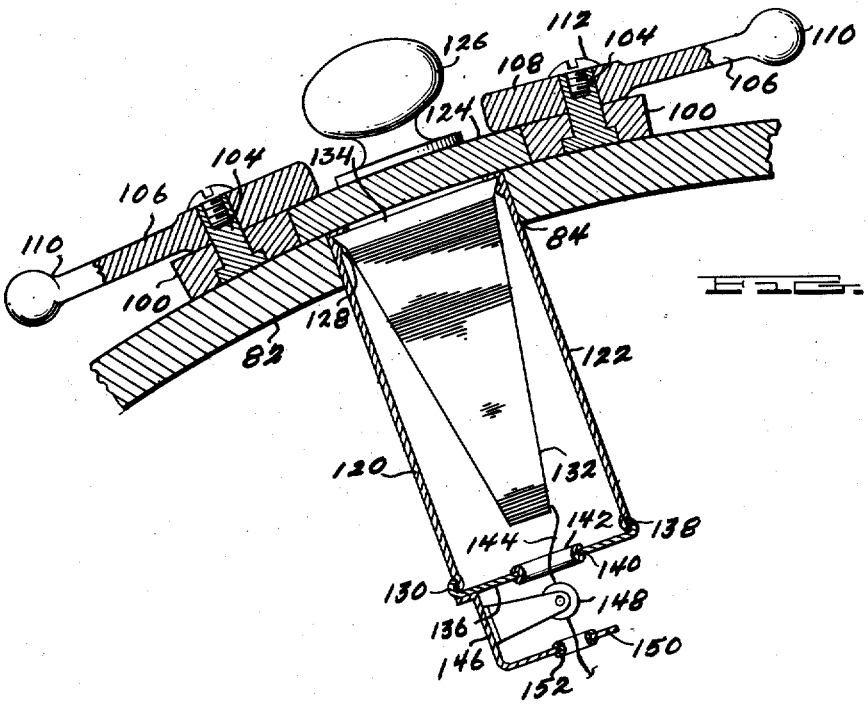
Figure 3 is a detail view showing the mounting of certain of the parts.
Figure 4:
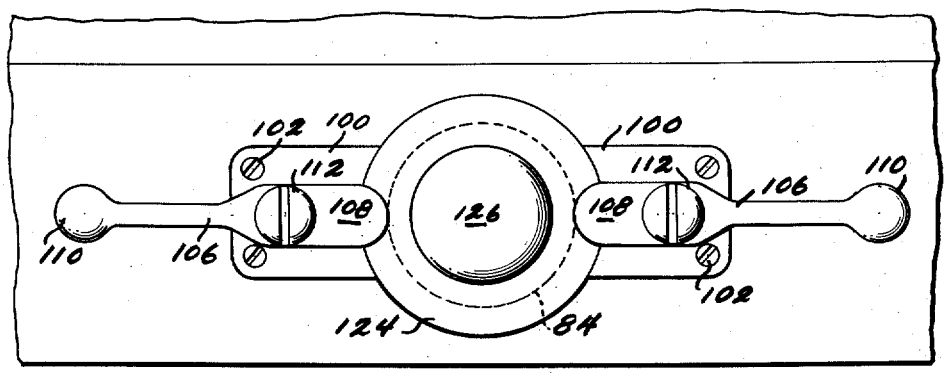
Figure 4 is a plan view of Figure 3.

The recharging operation and the details of filament supply will best be understood by reference to Figures 3 and 4.

The material of the cylindrical portion 82, adjacent the circular openings 84, is milled or otherwise treated to provide a flat surface to which a pair of lugs 100 are secured in diametric opposition around the openings 84. The lugs 100 may be secured to the cylindrical portion 82 by any suitable means such as screws 102. Each of the lugs 100 houses a pivot pin 104 upon which is rotatably mounted a locking lever 106 having a locking portion 108 and a handle portion 110. Cap screws 112 threaded into the pivot pins 104 serve to prevent axial sliding of the members 106 on the pivot pins 104.

When the members 106 are turned 90° from the position indicated in Figure 4 the locking portions 108 are moved clear of the apertures 84 to permit the insertion of spindle assemblies indicated generally at 120. The spindle unit 120 is made up of a sheet metal shell 122 suitably secured to a rigid backing member 124. The shell 122 is sized externally for a running fit through the apertures 84 while the backing member 124 is sized to fit between the lugs 100 and to overlie that portion of the cylindrical member 82 surrounding the apertures 84. A handle member 126 is secured to the backing member 124. A combination rib and groove 128 is formed internally of the base of the cylindrical shell 122 adjacent the backing member 124, while a similar extenral groove 130 is formed at the opposite or free end of the shell 122. A bobbin 132 containing reinforcing filaments has a resilient base 134 which by a simple thrust is frictionally engaged in the internal rib and groove combination 128 of the shell 122. A cap member 136 has a ribbed flange 138 which engages the external rib and groove 130 at the free end of the shell 122. The cap 136 has, at its center, an aperture 140 protected by a grommet 142 through which a filament 144 may be drawn from the bobbin 132. A bracket 146 is secured to to the cap 136 and has a conventional thread tensioning device 148 secured thereto. At its free end the cap 136 has an arm 150 in which is mounted a grommet 152 through which the filaments 144 pass after passing through the thread tensioning device 148.

Assuming that a wheel 60 has exhausted its charge of filaments and has been brought to a stop it is turned freely to give access to the various sets of members 106 which are turned 90° from the position of Figure 4 to permit withdrawal of the units 120 by means of the hand grips 126. The exhausted bobbins are then removed by a simple manual pull and a full bobbin inserted by manual thrust sufficient to engage the resilient flange 134 with the rib and groove 128. A quantity of filament is withdrawn and threaded through the grommet 142, the thread tensioning device, and the aperture 152. The unit 120 is then reinserted through the aperture 84 in the cylindrical portion 82 of the wheel 60 and the members 106 are restored to the position illustrated in Figure 4, thereby locking the unit 120 in place.

It will be noted that this disposition of the units 120 permits the centripetal force caused by rotation of the wheel 60 to hold the cap 136 of the base 134 of the bobbin 132 in place so that frictional engagement is ample and adequate for this purpose. The centripetal force is resisted by the relatively strong and rigid members 106 and the backing member 124. When the wheel 60 has been fully recharged all of the filaments on the upper side of the webs 10 and 12 are drawn together on one side of the machine and all the filaments below the webs 10 and 12 are brought together at the opposite side of the machine where they may be secured to any suitable clip or cleat. In the meantime the wheel 90 has been exhausting its charge of filaments and when it is brought to a stop the wheel 60 is started again. It is only necessary to release the filaments at each side of the machine after one revolution of the wheel to have the filaments begin to travel with the webs 10 and 12 and, within a very few feet of travel of the webs, the filaments will take on their proper spacing and slope.

Each filament, of course, is continuous as it travels around the belts 18 and 20. When these belts arrive at the combining roll 28 the webs 52 and 54 as shown in Figure 1 leave the belts 18 and 20 and these belts serve to break the loops of filament extending around them, permitting each web 52 and 54 to travel on with a series of individual disconnected transverse filaments between the plies.

It will be noted that in this disclosure there has been omitted any description of the details of conventional mechanical elements except where these are indispensible to understanding and operation of the machine. Any specific arrangement of motor, speed reducer, gearing, etc., is either dictated by local plant conditions or is a matter of the idiosyncrasies of any particular designer. The effort here has been to present only what applicant regards as the essence of the invention in sufficient detail to enable anyone skilled in the art to produce the machine and to practice the method. For this reason no attempt has been made to illustrate motors, bearings, clutch and brake details, supporting frames and other purely conventional elements.

I claim:

1. A machine for making reinforced webs comprising: means for superimposing a pair of webs; a pair of combining rolls receiving and advancing said superimposed webs; [means to supply an additional web to said combining rolls at each side of said superimposed webs;] a circular turret between said superimposing means and said combining rolls and means to rotate said turret, said turret surrounding said superimposed webs for rotation therearound; a plurality of spindles mounted on said turret and adapted to receive reels of reinforcing strand material; means to supply an additional pair of webs to said combining rolls, one of said webs lying on each exposed surface of said first two webs; means supplying a laminating agent between each exterior ply and the adjacent interior ply, means movable with said first named webs at the margins thereof for resisting the tension of said reinforcing material, said means entering between said combining rolls.

2. A machine as set forth in claim 1 in which the last named means comprises thin, flat belts passing through the turret, around one of the combining rolls and having a return pass outside the turret.

References Cited in the file of this patent or the original patent

UNITED STATES PATENTS

| | | |
|---|---|---|
| 1,195,949 | Carney | Aug. 22, 1916 |
| 1,195,951 | Carney | Aug. 22, 1916 |